(12) United States Patent
Janos et al.

(10) Patent No.: US 7,166,963 B2
(45) Date of Patent: Jan. 23, 2007

(54) ELECTRODELESS LAMP FOR EMITTING ULTRAVIOLET AND/OR VACUUM ULTRAVIOLET RADIATION

(75) Inventors: Alan Janos, Darnestown, MD (US); Malcolm Pack, Frederick, MD (US); Mohammad Kamarchi, Gaithersburg, MD (US); Michael B. Colson, Woodbine, MD (US)

(73) Assignee: Axcelis Technologies, Inc., Beverly, MA (US)

( * ) Notice: Subject to any disclaimer, the term of this patent is extended or adjusted under 35 U.S.C. 154(b) by 0 days.

(21) Appl. No.: 10/937,947

(22) Filed: Sep. 10, 2004

(65) Prior Publication Data

US 2006/0055300 A1    Mar. 16, 2006

(51) Int. Cl.
*H01J 61/30* (2006.01)
*H01J 17/16* (2006.01)
*H01J 9/24* (2006.01)

(52) U.S. Cl. ............... 313/634; 313/573; 313/493; 445/26; 445/27

(58) Field of Classification Search ............ 313/153, 313/160, 493, 634, 636, 317, 485
See application file for complete search history.

(56) References Cited

U.S. PATENT DOCUMENTS

| | | | |
|---|---|---|---|
| 3,234,431 A | 2/1966 | Bardocz | |
| 3,334,261 A | 8/1967 | Butler et al. | |
| 3,947,714 A | 3/1976 | Rehder et al. | |
| 4,156,826 A | 5/1979 | Hernqvist | 313/221 |
| 4,501,993 A * | 2/1985 | Mueller et al. | 315/248 |
| 4,885,047 A | 12/1989 | Ury et al. | |
| 4,945,290 A | 7/1990 | Eliasson et al. | |
| 5,504,391 A | 4/1996 | Turner et al. | |
| 5,541,475 A | 7/1996 | Wood et al. | |
| 5,670,844 A * | 9/1997 | Yasudaa et al. | 313/636 |
| 5,682,080 A | 10/1997 | Dolan et al. | |
| 5,686,793 A | 11/1997 | Turner et al. | |
| 5,837,484 A | 11/1998 | Trempe et al. | |
| 6,157,141 A | 12/2000 | Lapatovich et al. | |
| 6,162,406 A | 12/2000 | Michael | |
| 6,509,697 B1 | 1/2003 | Ervin et al. | |
| 6,559,607 B1 | 5/2003 | Ervin et al. | |

(Continued)

FOREIGN PATENT DOCUMENTS

DE    3336421 A * 5/1984

(Continued)

OTHER PUBLICATIONS

J.H. Stathis et al., "Photoinduced Paramagnetic Defects in Amorphous Silicon Dioxide", The American Physical Cociety, Physical Review B, vol. 29, No. 12, Jun. 15, 1984, pp. 7079-7081.

(Continued)

*Primary Examiner*—Mariceli Santiago
(74) *Attorney, Agent, or Firm*—Cantor Colburn LLP

(57) ABSTRACT

An electrodeless lamp and process for emitting ultraviolet and/or vacuum ultraviolet radiation comprises an envelope formed of an ultra-pure and/or low-defect quartz material and an ultraviolet and/or vacuum ultraviolet emissive material disposed in the interior region of the envelope. The electrodeless lamp formed of the ultra-pure and/or low-defect quartz material minimizes degradation during use.

22 Claims, 4 Drawing Sheets

U.S. PATENT DOCUMENTS

| | | | |
|---|---|---|---|
| 6,610,990 B1 | 8/2003 | Moruzzi | 250/504 R |
| 2003/0195107 A1 | 10/2003 | Ikuta et al. | 501/57 |
| 2004/0118155 A1 | 6/2004 | Brown et al. | 65/17.2 |
| 2005/0187092 A1 | 8/2005 | Bookbinder et al. | 501/54 |

FOREIGN PATENT DOCUMENTS

| | | | |
|---|---|---|---|
| EP | 1 125 897 A1 | | 8/2001 |
| JP | 62-106618 | | 5/1987 |
| JP | 02069332 A | * | 3/1990 |
| JP | 03279238 A | * | 12/1991 |
| JP | 08-091867 | | 4/1996 |
| JP | 2001-146434 | | 5/2001 |
| JP | 2001-180962 | | 7/2001 |

OTHER PUBLICATIONS

"Radiation Resistance of Quartz Glass for VUV Discharge Lamps", Schreiber et al., Proceedings of Science and Technology of Light Sources, 18-22, (Jul. 2004), Toulouse, France.

"Viscoelectric Properties And Density Fluctuations In Silica Using Inelastic Light Scattering", Levelut et al., Proceedings of Silica 98, Mulhouse 1-4 (Sep. 1998), 319-322.

Webpage from www.heraeus-quarzglas.com, date: Dec. 20, 2005.

Product Literature: "Fused Quartz and Fused Silica for Optics", (date unknown).

JP 2001-180962 Derwent Database Printout.

International Search Report And Written Opinion for International Patent Application PCT/US2005/032179 filed Sep. 8, 2005.

* cited by examiner

ELECTRODELESS LAMP FOR EMITTING ULTRAVIOLET AND/OR VACUUM ULTRAVIOLET RADIATION

BACKGROUND

This disclosure relates generally to light sources and, more particularly, to electrodeless lamps for emitting light in the ultraviolet (UV) and vacuum ultraviolet (VUV) spectra.

Discharge lamps (i.e., bulbs) and particularly electrodeless discharge lamps that contain an emissive material are known. For example, mercury based electrodeless lamps have been in use for many years. See generally Electric Discharge Lamps by Dr. John Waymouth, MIT Press, 1971. The emissive materials employed generally depend on the desired emitted light spectrum. For example, metal halides in combination with halogen doping of electrodeless lamps has been known since the 1960's and can be used to provide various infrared, visible, and ultraviolet containing light spectra. The use of Ba, Na, Ti, In and Cd iodides is disclosed in U.S. Pat. No. 3,234,431. Lanthanides and rare earth metals are also used as dopants in electrodeless bulbs to produce selected spectral emissions. U.S. Pat. No. 3,334,261 lists Y, La, Ce, Nd, Lu, Ho, Th, Pr, Gd, Th, Dy, and Er as dopants for electrodeless bulbs that produce visible light. U.S. Pat. No. 3,947,714 discloses the use of $FeI_2$ as an additive to the constituents of an electrodeless bulb. U.S. Pat. No. 6,157,141 discloses the use of Ga as a dopant in an electrodeless bulb. U.S. Pat. Nos. 5,837,484 and 4,945,290 disclose excimer electrodeless bulbs using noble gases and gas mixtures. U.S. Pat. Nos. 5,504,391 and 5,686,793 disclose excimer electrodeless lamps, which operate at high pressure.

General applications specific to the use of ultraviolet and vacuum ultraviolet light, include, among others, germicidal processes; toxic chemical treatment; curing of inks, coatings, and adhesives; screen printing; CD and DVD replication; label printing; graphic arts; packaging; circuit boards; optical fiber manufacture; and semiconductor manufacturing. However, a problem with the use of electrodeless bulbs operating at these shorter wavelengths is envelope degradation. Photochemical and thermal degradation can occur during use, which changes the spectral output and/or integrity of the lamp. As a result, useful operating lifetimes are deleteriously affected since many end use applications are sensitive to spectral output variation, such as for example, semiconductor fabrication processes that include exposure to ultraviolet and/or vacuum ultraviolet radiation, e.g., charge erasure, curing, photostabilization, surface cleaning, surface modification, oxidation, and the like. The variation in spectral output (both intensities and spectral shape) can affect wafer throughput, which is a significant concern in the semiconductor art.

As is known by those in the semiconductor arts, new processes will require shorter wavelengths as new technology nodes are developed. Light of a given wavelength will have more difficulty penetrating new technology nodes since feature sizes are smaller, metal lines and lines spaces are smaller, and there are generally more metal line layers. Accordingly, as technology nodes advance, there will be a need for shorter wavelength UV and VUV light sources so that the light can penetrate the integrated circuit structure. In a similar fashion, new materials are being developed, such as low-k dielectrics, some of which require wavelengths in the VUV in order to properly treat and/or cure the dielectric. Moreover, repeatability and reproducibility of the semiconductor process is of paramount concern. It is important to maintain processes that are constant from one wafer to the next as well as day-to-day. For UV and VUV processes, it is desirable to have a light source that provides a constant spectrum and intensity.

However, degradation with prior art electrodeless bulbs is particularly acute in the ultraviolet spectrum of about 200 nanometers (nm) to about 280 nm and in the vacuum ultraviolet spectrum of about 122 nm to about 200 nm. Degradation in light intensity can be as much as about 25 percent or more over a one-month period of substantially continuous operation, i.e., including duty cycle this is equivalent to several hundred hours of operation. Degradation is typically manifested by a loss of the shortest wavelengths followed by progressively higher wavelengths. Moreover, because electrodeless bulbs can often operate at very high intensities, the advantages of the higher intensities (shorter process times, for example) are counterbalanced by the faster degradation, since degradation rate is often directly proportional to intensity (photon flux, or number of photons passing through the bulb envelopes).

Accordingly, there is a need for improved electrodeless lamps that emit radiation in the ultraviolet and/or vacuum ultraviolet regions, wherein the electrodeless lamps provide a constant spectrum and intensity for extended periods of time.

BRIEF SUMMARY

Disclosed herein is an electrodeless lamp for emitting ultraviolet and./or vacuum ultraviolet radiation.

In one embodiment, an electrodeless bulb comprises an envelope formed of an ultra-pure and/or low-defect quartz material, wherein the envelope defines a sealed interior region; and an ultraviolet and/or vacuum ultraviolet emissive material disposed in the interior region, wherein the ultraviolet and/or vacuum ultraviolet emissive material emits ultraviolet and/or vacuum ultraviolet light in response to exposure to an energy source.

In another embodiment, the electrodeless bulb comprises an envelope formed of an ultra-pure and/or low-defect quartz material, wherein the envelope defines a sealed interior region; and an ultraviolet and/or vacuum ultraviolet emissive material disposed in the interior region, wherein the ultraviolet and/or vacuum ultraviolet emissive material emits ultraviolet and/or vacuum ultraviolet light in response to exposure to an energy source, wherein the ultra-pure and/or low-defect quartz material has a total metal content of less than 0.1 parts per million by weight, an OH content less than 1,000 parts per million by weight, and a Cl content of less than 10 parts per million by weight.

A process for generating ultraviolet light and/or vacuum ultraviolet light with a microwave electrodeless bulb comprises providing an electrodeless bulb with an envelope containing an ultraviolet emissive material and/or vacuum ultraviolet emissive material, wherein the envelope is formed of an ultra-pure and low-defect quartz material; and coupling the electrodeless bulb to an energy source which excites ultraviolet and/or vacuum ultraviolet emission, wherein the ultraviolet emission comprises one or more wavelengths between 200 nm and 400 nm, and wherein the vacuum ultraviolet emission comprises one or more wavelengths between 122 nm and 200 nm.

The above described and other features are exemplified by the following figures and detailed description.

BRIEF DESCRIPTION OF THE DRAWINGS

Referring now to the figures wherein the like elements are numbered alike.

DETAILED DESCRIPTION

Figure 1:
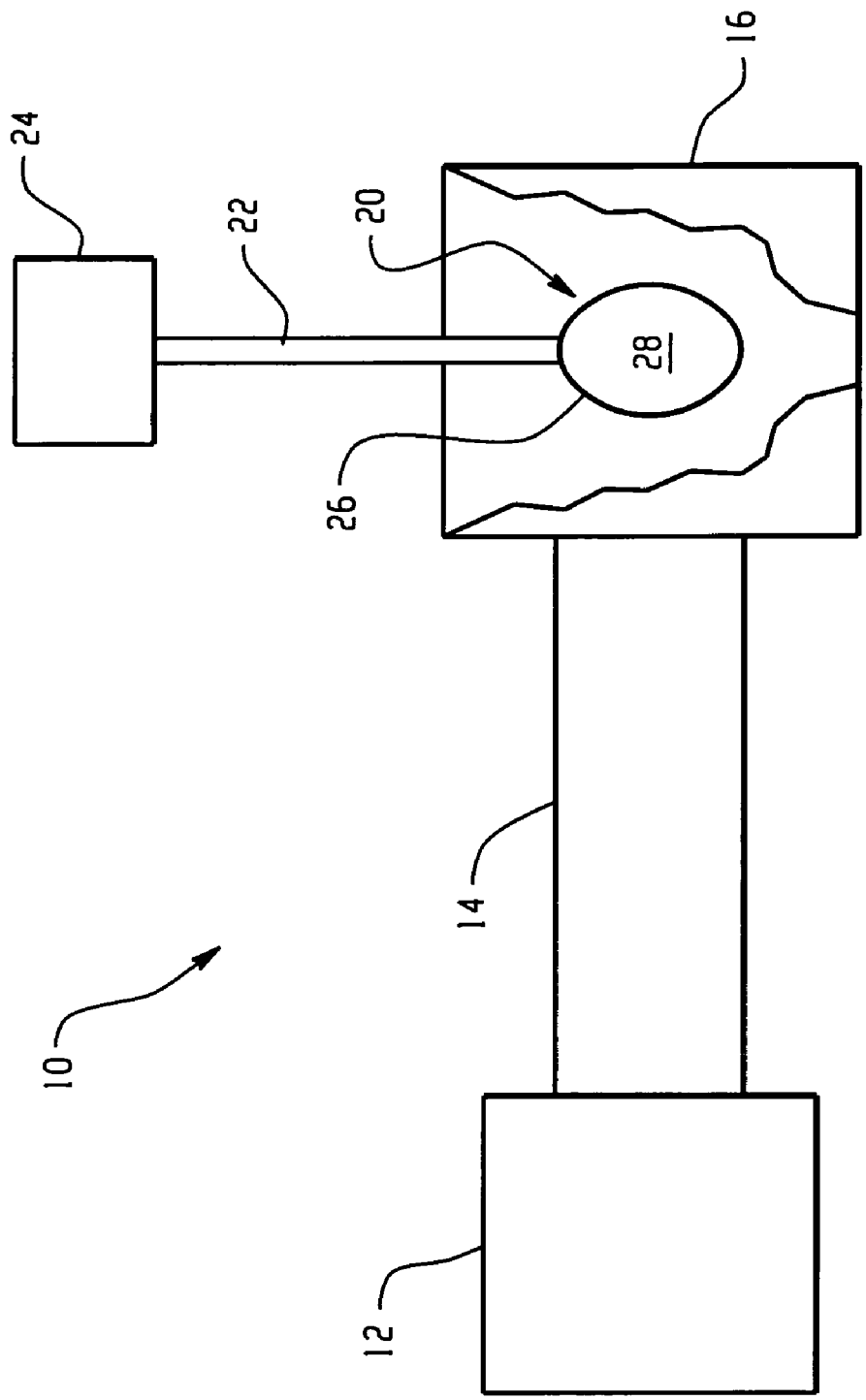
FIG. 1 depicts a block diagram of an electrodeless lamp system.

An improved electrodeless lamp for emitting ultraviolet and/or vacuum ultraviolet radiation is provided herein. The electrodeless bulb generally comprises an envelope formed of an ultra-pure and/or low-defect quartz material and an ultraviolet and/or vacuum ultraviolet emissive material contained therein. Applicants have advantageously discovered that by minimizing the amount of impurities and/or defects in the quartz network structure in the bulb envelope by use of the ultra-pure and/or low-defect quartz material, degradation can be minimized.

Intensity degradation in an electrodeless bulb is caused primarily by absorption by the quartz envelope. This absorption can be caused by color center formation. In turn, color center formation is generally caused by defects in the quartz. Defects can be categorized into two general types: 1) extrinsic impurities, such as metal contamination, and 2) defects in the normal $Si$—$O_2$ network structure, such as a Si atom bonding directly to another Si atom instead of to an oxygen atom, for example. In defect free $SiO_2$ quartz structure, each Si bonds to four other oxygen atoms in a lattice-like structure. The amount of impurities and/or network defects in the bulb envelope can cause formation of color centers, which can result in absorption of the emitted ultraviolet and vacuum ultraviolet radiation and can also lead to localized heating and/or overheating. Localized heating and/or overheating can result in increased thermal stresses and cause catastrophic bulb failure since these bulbs generally operate at elevated pressures. By using the ultra-pure and/or low-defect quartz material, transmission of ultraviolet (UV) and/or vacuum ultraviolet radiation (VUV) can be maximized and the formation of color centers minimized, thereby providing an electrodeless bulb of constant intensity with increased operating lifetimes relative to prior art bulbs.

The electrodeless bulb can be integrated for use in semiconductor manufacturing processes such as, but not limited to, curing of dielectric layers corresponding to the interlayer dielectric between different metal line levels; photostabilizing photoresists for masking purposes; erasing unwanted and potentially damaging charge on devices; preparing surfaces for deposition to improve adhesion; resetting nonvolatile memories; improvement of properties of low-k dielectric materials; surface cleaning of contaminants; corrosion prevention of vias after exposure to plasma processes followed by wet cleans; reduction in charge and charge trap density, both in the bulk of oxides and at the interface between the oxides and silicon or polysilicon; and the like.

As used herein, the term "ultra-pure quartz" generally refers to the impurities in the quartz material whereas the term "low-defect quartz" refers to imperfections in the basic quartz material of Si (silicon) and O (oxygen), and in the structure or network of these elements. To minimize degradation relative to prior art bulb materials, the bulbs in accordance with the present disclosure can be fabricated from ultra-pure quartz or low defect quartz or a combination of ultra-pure and low defect quartz.

In one embodiment, the impurities are metals and each metal in the ultra-pure quartz is present in an amount less than 0.1 part per million (ppm), with less than 0.01 ppm more preferred, and with less than 0.001 ppm even more preferred.

In yet another embodiment, the total amount of metals in the quartz material is less than 10 ppb by weight and additionally has an OH content of less than 1,000 parts per million (ppm), with less than 100 ppm preferred, and an OH content of less than 10 ppm even more preferred.

In still another embodiment, the term "ultra pure quartz" refers to a titanium metal content of less than 0.01 ppm.

As used herein, the term "low-defect quartz" refers to imperfections in the basic quartz material of Si (silicon) and O (oxygen), and in the structure or network of these elements. In one embodiment, a defect is a missing oxygen so that a Si bonds directly to another Si. (In the perfect case, each Si atom bonds to four other O atoms.) This Si—Si bond, or oxygen deficiency center (ODC) can lead to an absorption color center corresponding to 163 nm, for example. In another embodiment, a defect is a dangling bond which can exist on a Si atom (E' center), leading to absorption at 215 nm. Other embodiments can exist.

These color center defects do not correspond directly with impurities, but can be created because of prior presence of impurities such as hydrogen or Cl. These latter elements, H or Cl, are often used in the manufacturing process of quartz. As such, they are termed precursors to the quartz matrix defects that directly cause absorption of degradation of light intensity. These precursors are activated by illumination of the quartz by low wavelength UV.

In one embodiment, the defect precursor is Cl and Cl in the low-defect quartz is present in an amount less than 10 part per million, with less than 1 parts per million more preferred, and with less than 0.1 parts per million even more preferred.

In another embodiment, the defect precursor is H and H in the low-defect quartz is present in an amount less than the OH content, since OH aids in removing H while not generating an ODC defect.

While OH content determines to some extent the low-wavelength cutoff (around 160 nm), an OH content higher than the H content will help prevent ODC's. Cl, used to remove OH, actually acts similarly to H in generating color centers. Hence, it can be desirable in some embodiments to maintain a low Cl level rather than a low OH level, as long as the cutoff is below that needed for the particular desired spectrum.

A suitable ultra pure and low defect quartz is commercially available from Heraeus under the trade name Suprasil 300 or Suprasil 310. The OH content of Suprasil 300 is reported to be less than 1 ppm. The metal and OH content for Suprasil 300 is shown in Table 1. Also shown is the metal and OH content for GE 214, which is commercially available quartz material from the General Electric Company and is commonly employed in the art for fabrication of plasma tubes.

TABLE 1

| Impurity | Suprasil 300 (ppm) | GE 214 (ppm) |
| --- | --- | --- |
| Al | <0.01 | 14 |
| As | <0.01 | <0.002 |
| B | <0.01 | <0.2 |
| Ca | <0.01 | 0.4 |
| Cd | <0.01 | <0.01 |
| Cr | <0.01 | <0.05 |
| Cu | <0.01 | <0.05 |
| Fe | <0.01 | 0.2 |
| K | <0.01 | 0.6 |
| Li | <0.01 | 0.6 |
| Mg | <0.01 | 0.1 |
| Mn | <0.01 | <0.05 |
| Na | <0.01 | 0.7 |
| Ni | <0.01 | <0.1 |
| P | <0.01 | <0.2 |
| Sb | <0.01 | <0.003 |
| Ti | <0.01 (0.050) | 1.1 |
| Zr | <0.01 | 0.8 |
| OH | <1 | 5 |

Referring now to FIG. 1, there is depicted a block diagram of an electrodeless lamp system, generally designated by reference numeral 10. A generator 12 generates microwave and/or rf energy and delivers the energy into waveguide 14. Waveguide 14 directs the generated energy into cavity 16, which may include a mesh screen (not shown) for retaining generated waves within cavity 16 while allowing light waves to exit. An electrodeless bulb 20 within cavity 16 contains the ultraviolet and/or vacuum ultraviolet emissive material, which provides the desired spectrum of light when excited by the generated energy waves, e.g., ultraviolet and/or vacuum ultraviolet radiation. More particularly, the radiation of the energy waves excites fill atoms in bulb 20 to effect discharge and/or excitation of electrons. The discharged and/or excited electrons collide with other fill atoms causing a further discharge and/or excitation of electrons, thereby increasing the total population of electrons and excited atoms/molecules. The increased population of electrons and excited atoms/molecules results in the emission of light.

The electrodeless bulb 20 generally includes a discharge envelope 26 defining a sealed interior region 28 coupled to a stem 22, which can be further connected to a motor 24 that can rotate the bulb 20 about the longitudinal axis of the bulb, as may be desired for some applications. The discharge envelope 26 is fabricated from ultra-pure and/or low-defect quartz as previously defined and the interior region 28 defined thereby contains the ultraviolet and/or vacuum ultraviolet emissive material. Although the shape of the bulb is depicted as substantially spherical, other shapes are contemplated. For example, the bulb can have a spherical shape (as shown in FIG. 1), a tubular shape, a prolate shape, an oblate shape, and the like. The shape of the bulb is not intended to be limited.

By way of example, a suitable electrodeless bulb for microwave excitation can be spherical and have a diameter 1.2 inches with a wall thickness of 0.04 to 0.06 inches. This particular bulb is especially suitable for use in a photostabilizer for curing and/or removing materials during integrated circuit fabrication such as, for example, the photostabilizer commercially available from Axcelis Technologies Inc. under the trade name RapidCure.

A cooling fluid stream (not shown) may be directed at the bulb 20 to provide a means for cooling the bulb 20 during operation. For example, a cooling fluid stream may be provided by a fan, or a blower, or a source of compressed cooling fluid, e.g., compressed air, to pass cooling fluid by the bulb for forced cooling of the bulb. Under some circumstances and applications, rotation of the bulb 20 may be sufficient to provide adequate cooling.

The ultraviolet and/or vacuum ultraviolet emissive material emits ultraviolet and/or vacuum ultraviolet light in response to exposure to a suitable energy source. As used herein the term "ultraviolet light (UV)" is intended to refer to the wavelength spectrum from 200 nanometers (nm) to 400 nm. The term "vacuum ultraviolet (VUV)" is intended to refer to the wavelength spectrum from 122 nm to 200 nm. Suitable UV and/or VUV emissive materials generally comprise Hg, Ar, Xe, Kr, $Cl_2$ and combinations comprising at least one of the foregoing materials as the emissive material at gas pressures of about 1 to about 3,000 torr.

In addition, emissive materials may further consist of stabilizing agents such as at least one salt such as, for example, Fe, Co, Ni, Al, Ga, Al, and Pb halides, which can be used to provide strong emissions of radiation at wavelengths different from those radiated by Hg atoms, for example. With regard to Hg, the envelope is generally filled at a pressure of 20 to 600 Torr at room temperature and at a bulb volume of about 0.1 to about 100 $mg/cm^3$. With regard to Xe and Kr, the envelope is generally filled at a pressure of 10 to 2,500 Torr at room temperature. With regard to $Cl_2$, the envelope is generally filled at a pressure of 0.5 to 200 Torr at room temperature. The bulb may contain additional materials for producing the desired spectral pattern. For example, the emissive material may further include a halide dopant such as, for example, Cd, Sr, Si, and/or Pt to provide additional spectral lines. Other elements that can be added to provide additional spectral lines include, but are not intended to be limited to, Mg, Mo, Be, Cd, Ge and Li. Likewise, the emissive material may further include discharge stabilizers, such as, for example, $HgCl_2$ or $HgI_2$.

The power system can be configured as follows. A microwave or radiofrequency (rf) source generates power, which is preferably from about 200 to about 10,000 watts per cubic centimeter of bulb volume, with about 200 to 1,000 watts per cubic centimeter of bulb volume more preferred, the latter corresponding to about 4,500 to about 7,000 watts of magnetron power. The frequency may range from high frequencies upwards of 3 gigahertz to low frequencies below 100 kilohertz. As an example, a magnetron for microwave excitation can be selected to provide microwaves ranging in frequency between 2.4 gigahertz (GHz) and 2.5 GHz, being centered at 2.45 GHz. The envelope temperature can be maintained at a controlled temperature by controlled rotation and/or forced air-cooling. The cooling airflow may be laminar while rotating the bulb at a speed of at least about 20 revolutions per minute (rpm), for example. As a result of the foregoing operational parameters, the envelope is thermally and electrically stable.

EXAMPLES

Example 1

Figure 2:
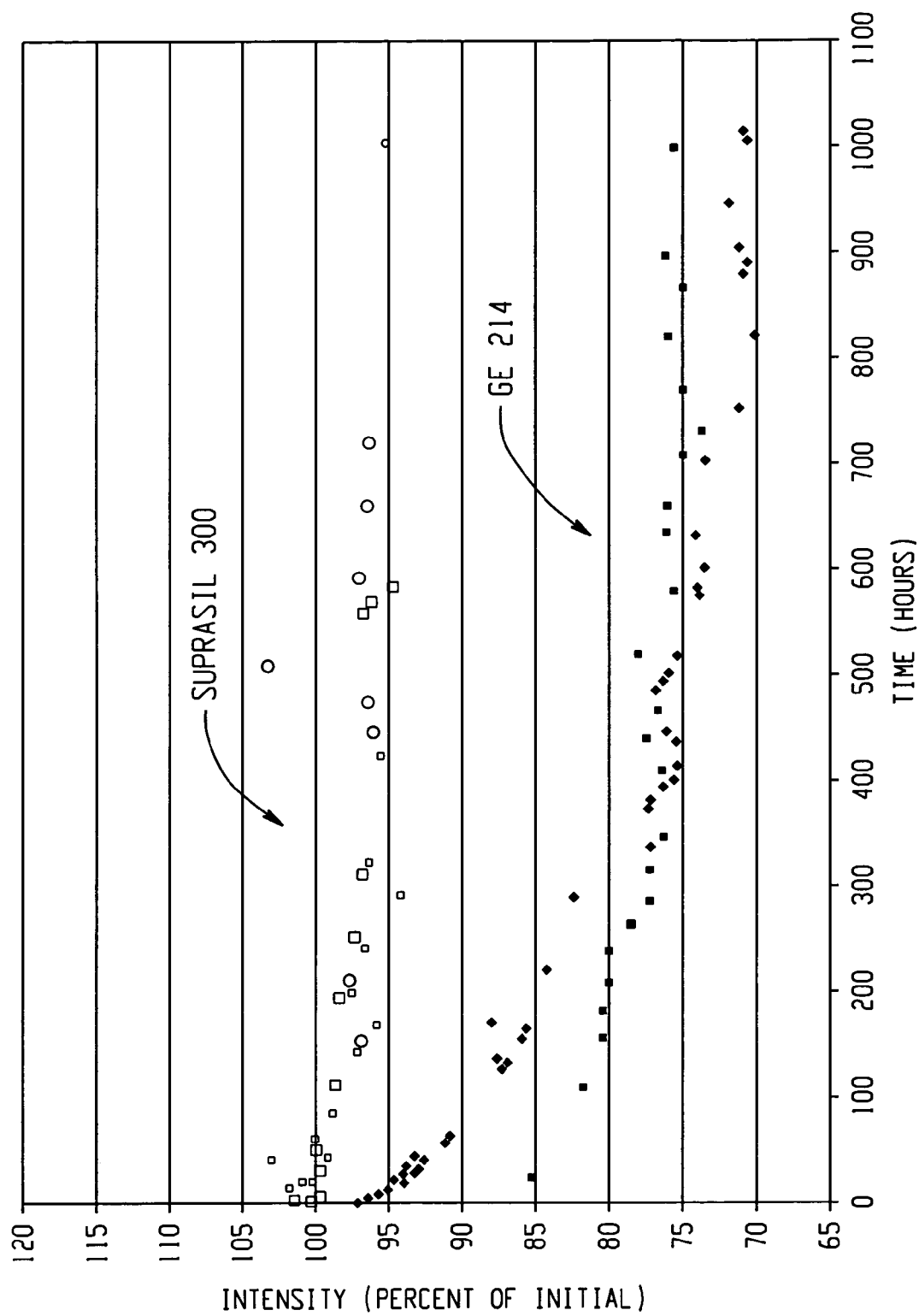
FIG. 2 graphically illustrates intensity as a function of time for an electrodeless lamp comprising an envelope formed of an ultra-pure and low-defect quartz material relative to an envelope formed of a prior art quartz material.

In this example, spectral output intensity was measured as a function of time for various electrodeless bulbs of identical fills fabricated from ultra-pure and low defect quartz and a prior art quartz. The ultra-pure and low defect quartz was Suprasil 300 commercially available from Heraeus Company; the prior art quartz was GE 214 commercially available from General Electric Company. Output intensity levels were on the order of hundreds of milliwatts over typical bandwidths of 50 nm width. FIG. 2 graphically illustrates the results. Clearly, degradation was significantly improved relative to the controls. Degradation over a 1,000 hour period resulted in about 6 percent degradation for the bulb fabricated from ultra-pure and low defect quartz. In contrast, the prior art electrodeless bulb exhibited a 25 to 30 percent reduction in output intensity over the same time period. Moreover, it was observed that the most significant degradation of the prior art envelope occurred after the first 100 to 200 hours of operation.

Figure 3:
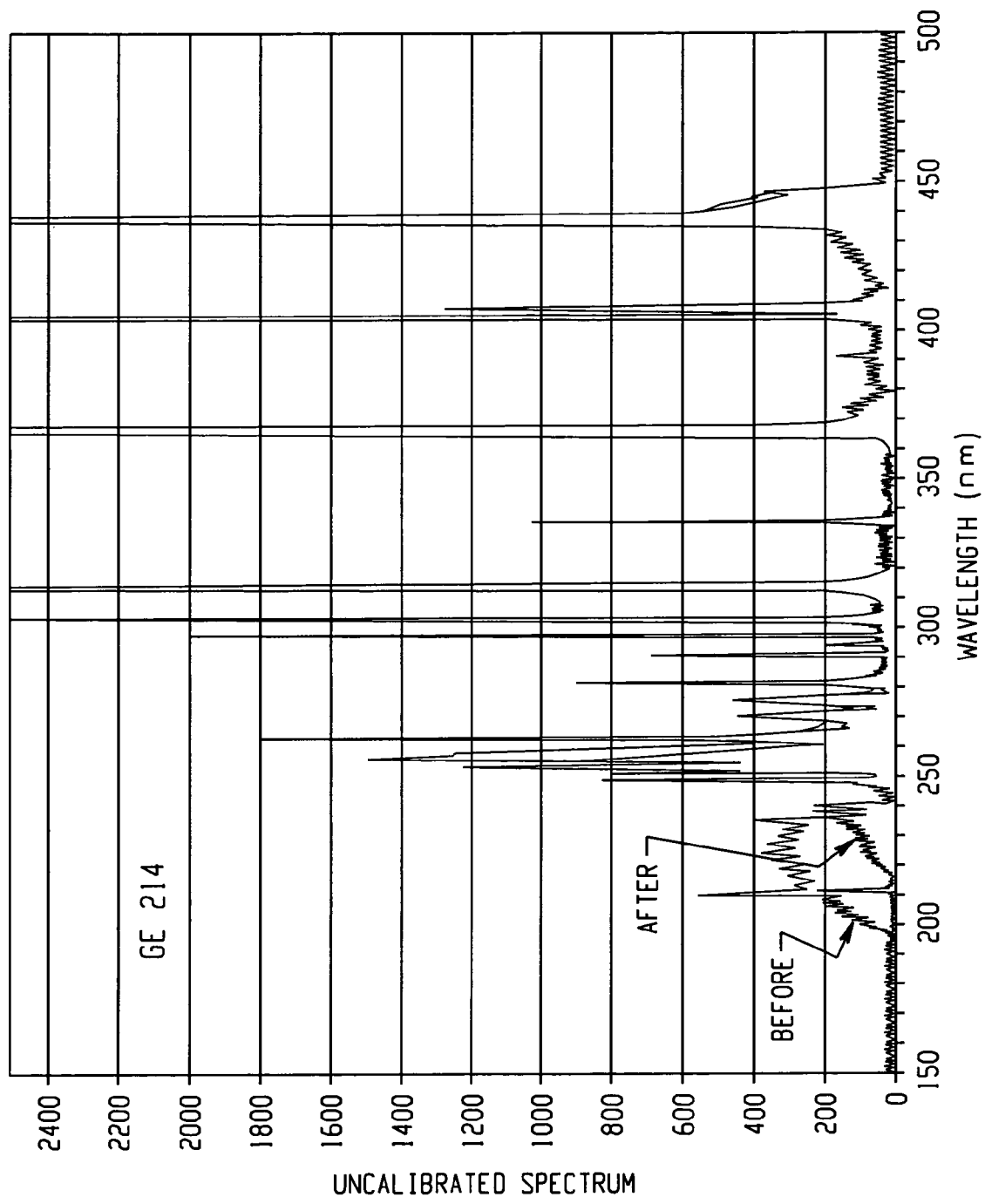
FIG. 3 graphically illustrates output spectra of an electrodeless lamp formed of GE 214 before and after use for several hundred hours.
Figure 4:
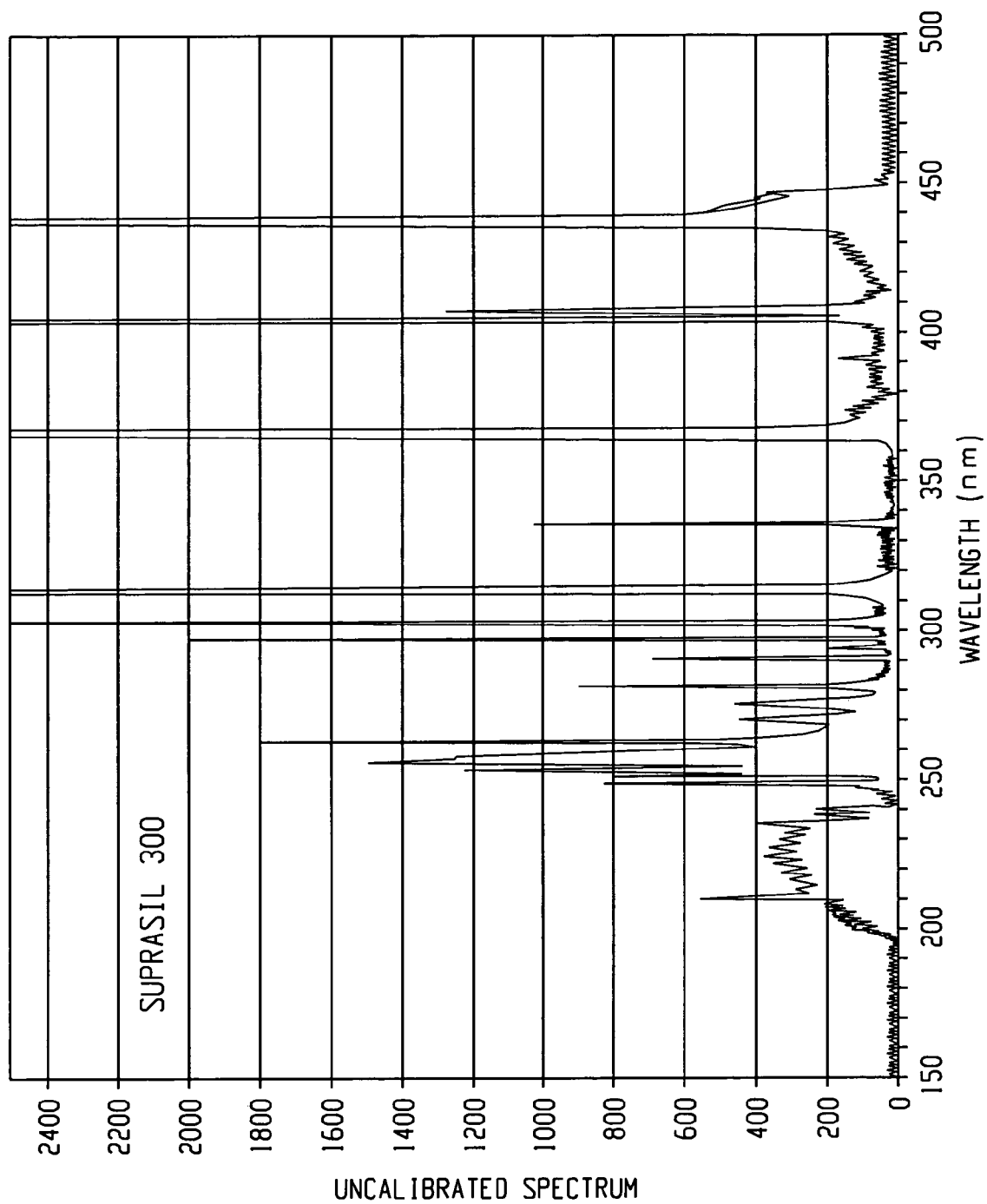
FIG. 4 graphically illustrates output spectra of an electrodeless lamp formed of Suprasil 300 before and after use for several hundred hours.

FIG. 3 graphically illustrates emission spectra as a function of wavelength for the bulb fabricated from prior art quartz (GE 214) before and after several hundred hours of use, i.e., exposure to ultraviolet radiation. At above 280 nm, there is minimal observed degradation. However, at the lower wavelengths degradation becomes more pronounced. As shown, after several hundred hours of use, radiation was completely blocked at wavelengths from about 190 nm to about 205 nm for the envelope fabricated from GE 214. In contrast, as shown in FIG. 4, an envelope formed of Suprasil 300 showed minimal degradation over the same time period of use. Emission at wavelengths less than 205 nm was not blocked and minimally degraded.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An electrodeless bulb comprising:
an envelope formed of an ultra-pure and/or low-defect quartz material, wherein the envelope defines a sealed interior region, and wherein the H content of the quartz material is less than the OH content; and
an ultraviolet and/or vacuum ultraviolet emissive material disposed in the interior region, wherein the ultraviolet and/or vacuum ultraviolet emissive material emits ultraviolet and/or vacuum ultraviolet light in response to exposure to an energy source.

2. The electrodeless bulb of claim 1, wherein the energy source comprises microwave energy and/or radio-frequency energy.

3. The electrodeless bulb of claim 1, wherein the OH content is less than 1,000 parts per million by weight.

4. The electrodeless bulb of claim 1, wherein the OH content is less than 100 parts per million by weight.

5. The electrodeless bulb of claim 1, wherein the ultra-pure and/or low-defect quartz material has a Cl content less than 10 parts per million by weight.

6. The electrodeless bulb of claim 1, wherein the ultra-pure and/or low-defect quartz material has a Cl content less than 1 parts per million by weight.

7. The electrodeless bulb of claim 1, wherein the ultra-pure and/or low-defect quartz material has a total metal content of less than 0.1 parts per million by weight.

8. The electrodeless bulb of claim 1, wherein the ultra-pure and/or low-defect quartz material has a metal content of less than 0.01 parts per million by weight for each metal in the ultra-pure and/or low-defect quartz material.

9. The electrodeless bulb of claim 1, wherein the ultra-pure and/or low-defect quartz material has less than 0.01 parts per million by weight titanium.

10. The electrodeless bulb of claim 1, wherein the ultra-pure and/or low-defect quartz material has a total metal content less than 0.1 parts per million by weight, an OH content less than 10 parts per million by weight, and a Cl content less than 10 parts per million by weight.

11. The electrodeless bulb of claim 1, wherein the ultraviolet emissive material emits light at wavelengths from 200 nm to 400 nm and the vacuum ultraviolet emissive material emits light at wavelengths from 122 nm to 200 nm.

12. An electrodeless bulb comprising:
an envelope formed of an ultra-pure and/or low-defect quartz material, wherein the envelope defines a sealed interior region; and
an ultraviolet and/or vacuum ultraviolet emissive material disposed in the interior region, wherein the ultraviolet and/or vacuum ultraviolet emissive material emits ultraviolet and/or vacuum ultraviolet light in response to exposure to an energy source, wherein the ultra-pure and/or low-defect quartz material has a total metal content of less than 0.1 parts per million by weight, an OH content less than 1,000 parts per million by weight, and a Cl content of less than 10 parts per million by weight, and wherein an H content of the quartz material is less than the OH content.

13. A process for generating ultraviolet light and/or vacuum ultraviolet light with a microwave electrodeless bulb comprising:
providing an electrodeless bulb with an envelope containing an ultraviolet emissive material and/or vacuum ultraviolet emissive material, wherein the envelope is formed of an ultra-pure and/or low-defect quartz material, wherein an H content of the quartz material is less than an OH content; and
coupling the electrodeless bulb to an energy source which excites ultraviolet and/or vacuum ultraviolet emission, wherein the ultraviolet emission comprises one or more wavelengths between 200 nm and 400 nm, and wherein the vacuum ultraviolet emission comprises one or more wavelengths between 122 nm and 200 nm.

14. The process of claim 13, wherein the energy source comprises microwave energy and/or radio frequency energy.

15. The process of claim 13, wherein the ultra-pure and/or low-defect quartz material has a total metal content of less than 0.1 parts per million by weight.

16. The process of claim 13, wherein the ultra-pure and/or low-defect quartz material has a metal content of less than 0.01 parts per million by weight for each metal.

17. The process of claim 13, wherein the OH content is less than 1,000 parts per million by weight.

18. The process of claim 13, wherein the OH content is less than 100 parts per million by weight.

19. The process of claim 13, wherein the ultra-pure and/or low-defect quartz material has a Cl content of less than 10 parts per million by weight.

20. The process of claim 13, wherein the ultra-pure and/or low-defect quartz material has a Cl content of less than 1 part per million by weight.

21. The process of claim 13, wherein the ultra-pure and/or low-defect quartz material has less than 0.01 parts per million by weight titanium.

22. The process of claim 13, wherein the ultra-pure and/or low-defect quartz material has a total metal content of less than 0.1 parts per million by weight, the OH content is less than 1,000 parts per million by weight, and a Cl content of less than 10 parts per million by weight.

* * * * *